United States Patent [19]

François et al.

[11] Patent Number: 5,121,815
[45] Date of Patent: Jun. 16, 1992

[54] EMERGENCY LUBRICATING DEVICE FOR A REDUCTION UNIT PARTICULARLY FOR A MAIN GEAR BOX OF A ROTARY-WING AIRCRAFT

[75] Inventors: Roland C. François, Cabries; Paul H. Marnot, Cornillon-Confoux, both of France

[73] Assignee: Aerospatiale Societe Nationale Industrielle, Paris, France

[21] Appl. No.: 656,889

[22] Filed: Feb. 19, 1991

[30] Foreign Application Priority Data

Feb. 20, 1990 [FR] France .............................. 90 02015

[51] Int. Cl.⁵ .............................................. F01M 1/18
[52] U.S. Cl. .................................. 184/6.4; 184/6.12
[58] Field of Search .................. 184/6.4, 6.12, 6.11; 74/467; 123/196 R

[56] References Cited

U.S. PATENT DOCUMENTS

| | | | |
|---|---|---|---|
| 2,988,154 | 6/1961 | Hub | 416/42 |
| 4,169,519 | 10/1979 | Hirt et al. | 184/6.12 |
| 4,683,985 | 8/1987 | Hultgren | 184/6.12 |
| 4,721,185 | 1/1988 | Weigle | 184/6.12 |
| 4,856,273 | 8/1989 | Murray | 184/6.4 |
| 4,858,427 | 8/1989 | Provenzano | 184/6.4 |
| 4,922,765 | 5/1990 | Hayakawa | 184/6.12 |

FOREIGN PATENT DOCUMENTS

| | | |
|---|---|---|
| 843186 | 7/1952 | Fed. Rep. of Germany . |
| 1252017 | 11/1963 | Fed. Rep. of Germany . |
| 3730916A1 | 9/1987 | Fed. Rep. of Germany . |
| 1194993 | 4/1958 | France . |
| 2003737 | 3/1969 | France . |
| 2116645 | 9/1983 | United Kingdom . |

*Primary Examiner*—Ira S. Lazarus
*Assistant Examiner*—Alan B. Cariaso
*Attorney, Agent, or Firm*—Armstrong, Nikaido, Marmelstein, Kubovcik & Murray

[57] ABSTRACT

An emergency lubricating device is disclosed for a reduction unit, particularly for the main gearbox of a rotary-wing aircraft, including a branch duct (10), coming from the normal lubricating circuit (3) of a rotary-wing aircraft gearbox (1), which feeds oil to at least one emergency reservoir placed at the upper part of the gearbox. The reservoir delivers the oil continuously through calibrated emergency supply ducts to the critical elements of the reduction unit (8, 9).

4 Claims, 3 Drawing Sheets

EMERGENCY LUBRICATING DEVICE FOR A REDUCTION UNIT PARTICULARLY FOR A MAIN GEAR BOX OF A ROTARY-WING AIRCRAFT

FIELD OF THE INVENTION

The invention relates to an emergency lubricating device for extending the operating time and improving the safety of a gear reduction unit should the normal lubrication be out of service, and relates more particularly to a device for ensuring minimum lubrication of the essential elements of the reduction unit. It applies more particularly to the main gear boxes inserted between the engine or engines and the rotor or rotors of rotary-wing aircraft.

BACKGROUND OF THE INVENTION

In these gear boxes, the reduction elements, comprising gears and bearings, are generally lubricated by pressurized oil through one or more lubrication pumps which are driven by sets of gears taking their movement from a main train of the reduction gears, or from an auxiliary drive source.

When the normal lubricating system of the main reduction unit is defective, either by loss of oil due to a leak, or by deterioration of the pressure generator or of the pump, it is obviously important for a minimum lubricating system to be able to replace it. Thus, a rotary-wing aircraft could, if needed, reach a favourable landing point with minimum power. This would be particularly advantageous for rotary-wing aircraft making extensive flights over the sea, for example those used for "offshore" oil working.

Emergency lubricating systems already exist which are adapted for vehicles or boats and which consist in providing at least one auxiliary oil reservoir, disposed at a higher point than the mechanisms to be lubricated. For example, in the U.S. Pat. No. 4,721,185 an oil reserve system for vehicles is described in which a complementary reservoir fed with oil supplies filtered oil, drawn by a pump from the hydraulic system of the vehicle. To take the oil from the reservoir a pump is therefore required which is not safe from defective operation. In another field, such as that of boats, as shown by the example in the U.S. Pat. No. 2,988,154, a normal lubricating circuit is adapted to feed a second reservoir placed in a high situation, with pumps and valves for maintaining an equal oil pressure whatever the condition of use.

All these systems are emergency lubricating systems for palliating a partial or total pressure failure and they use the distribution of the normal device to provide equivalent lubrication. But such an emergency system remains inoperative if the normal circuit is itself totally defective, for example following the total loss of lubricating fluid. This is why the applicant has designed a device which ensures minimum lubrication of the essential elements of the reduction unit, even if there is an accidental absence of supply for the normal circuit and the auxiliary emergency circuit, for pressurized lubrication of said reduction unit, including when the normal oil reserve which feeds the normal lubricating circuit is exhausted. The device in question makes minimum lubrication then possible so that the reduction unit can operate for a sufficient time to allow landing under good safety conditions.

SUMMARY OF THE INVENTION

The object of the invention is then to provide an emergency lubricating device for a reduction unit and more particularly for the main gearbox of a rotary-wing aircraft in which a normal lubricating circuit, fed by a pump taking oil from a normal lower reservoir, distributes the oil under pressure, through nozzles, in the direction of the reduction unit, in which device at least one branch duct coming from the normal circuit feeds oil to at least one emergency reservoir placed at the upper part of the reduction unit. The reservoir distributes the oil continuously by gravity to the critical elements of the reduction unit.

According to particular characteristics of the invention, the upper part of the emergency reservoir is open so as to form an overflow for the oil and allow it to return to the lower reservoir. Furthermore, the emergency reservoir is provided at its lower part with emergency feed ducts for lubricating the critical elements of the reduction unit by gravity. This emergency distribution circuit comprises a flow limitation so that the amount of oil distributed by this circuit is minimum but however sufficient to avoid any serious damage to the critical elements of the reduction unit during the time desired for its emergency operation, the normal distribution circuit being totally inoperative.

As a variant, an emergency pump is provided on at least one emergency feed duct for supplying the emergency nozzles at a low rate.

BRIEF DESCRIPTION OF THE DRAWINGS

Other characteristics and advantages of the invention will be clear from the following description of embodiments, with reference to the accompanying drawings which show.

DESCRIPTION OF THE PREFERRED EMBODIMENTS

Figure 1:
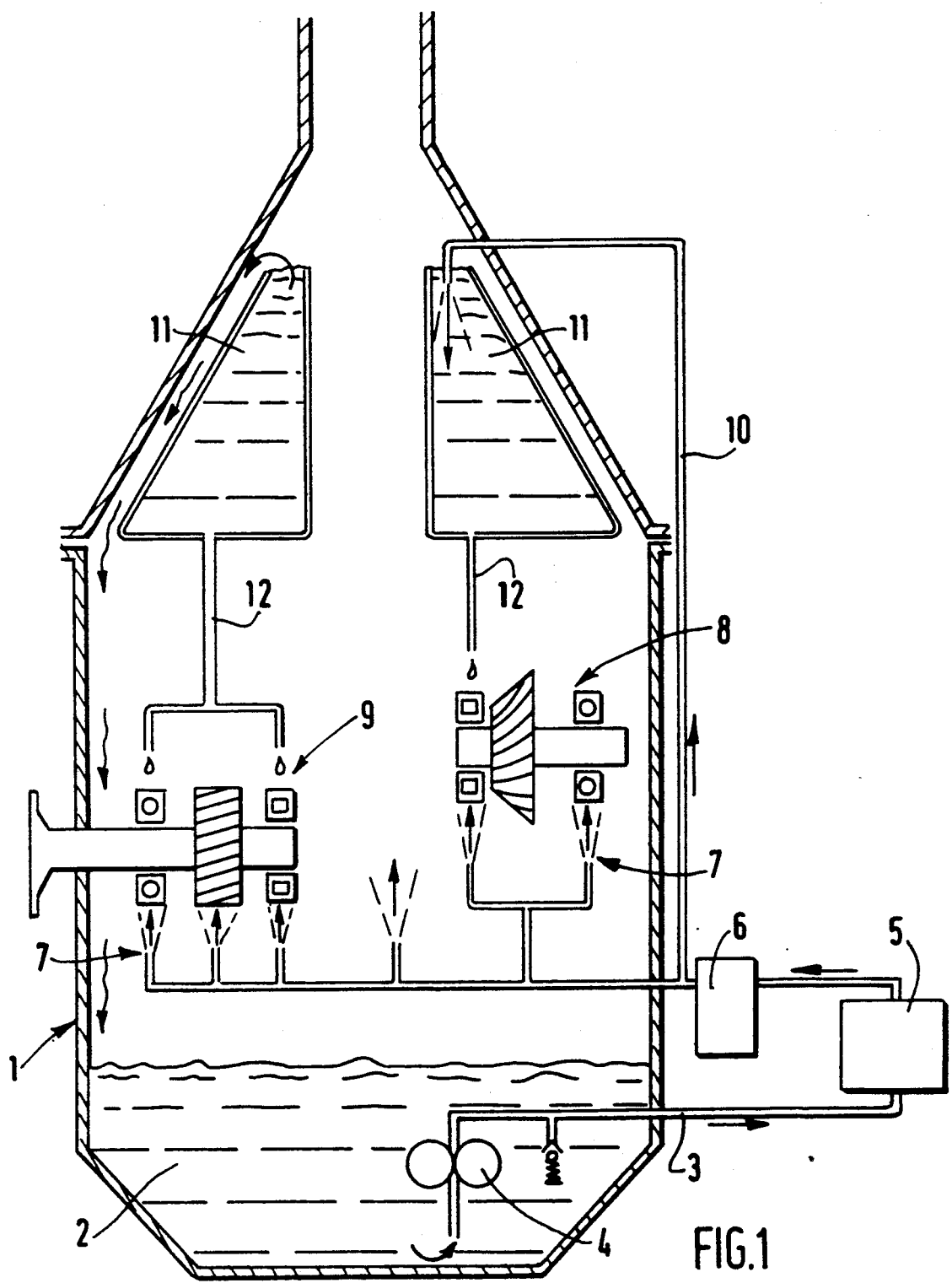
FIG. 1, a schematic sectional view of a lubricating device in normal operation.

In FIG. 1, the main gear-box 1 of a rotary-wing aircraft has been shown with, at its lower part, an oil reservoir 2. The normal distribution circuit 3, fed by a pump 4, passes through an exchanger 5 and a filter 6 and distributes pressurized oil through feed nozzles 7, in the direction of the reduction unit elements 8 and 9, formed by gears carried by shafts rotating in bearings. A branch duct 10, from the normal circuit 3, distributes filtered oil to an emergency reservoir 11, placed at the upper part of gear-box 1, whose upper part forms an overflow for the oil which can return to the normal lower reservoir 2. The emergency reservoir has at its lower part calibrated emergency feed ducts 12 for lubricating the critical elements of the reduction gears 8 and 9 by gravity and from above. This complementary supply of oil brought by the emergency ducts may duplicate the normal arrival through nozzles 7, or else form the single local oil supply system.

In normal operation, i.e. when the normal lubricating circuit 3 is fed from reservoir 2, the oil flow brought by duct 10 to the emergency reservoir 11 is greater than the flow of oil flowing by gravity in the calibrated emergency ducts 12 in the direction of the reduction units. The result is that the emergency reservoir 11 is always full and the oil overflows so that the excess oil returns to the normal lower reservoir 2.

Figure 2:
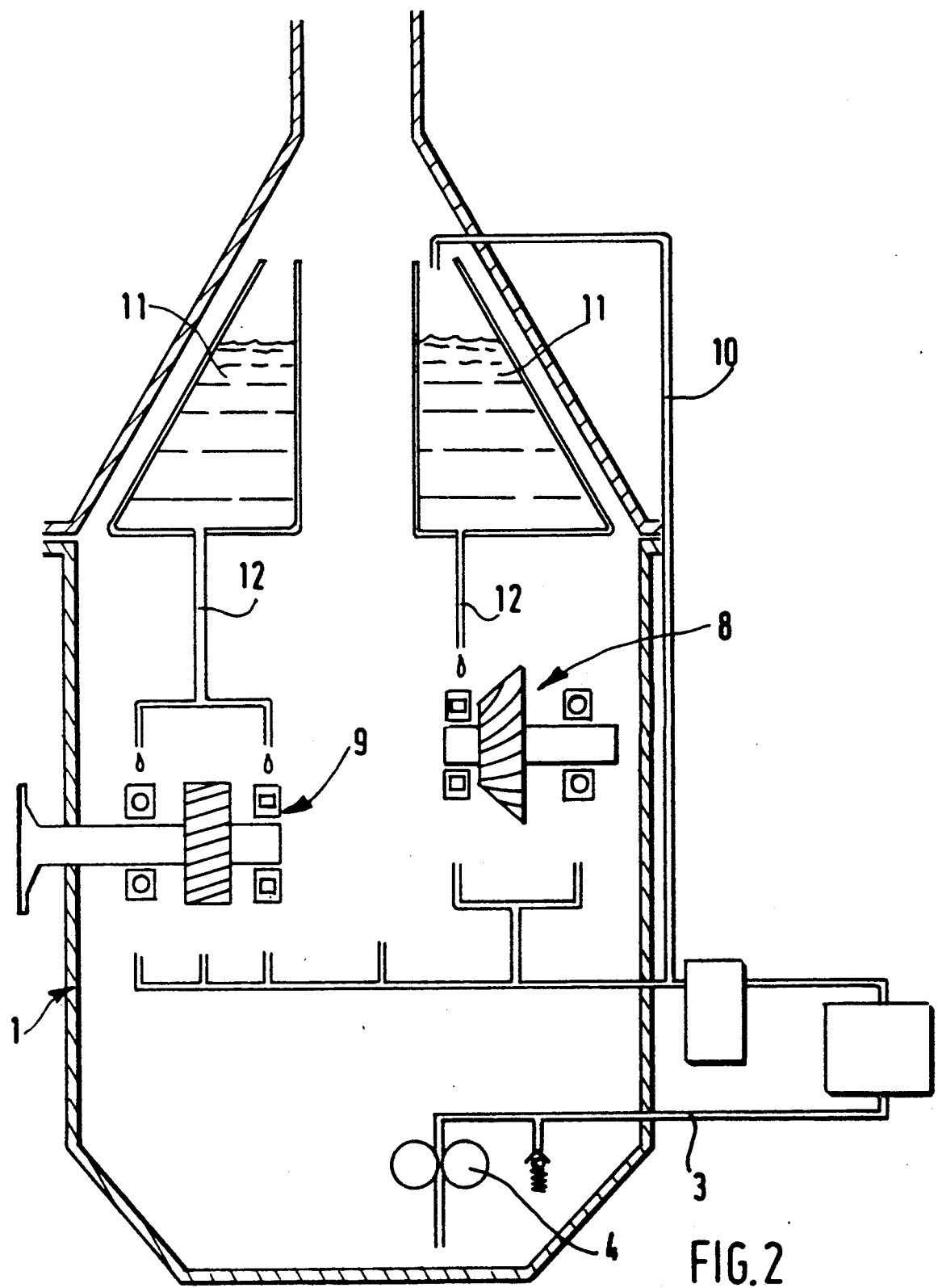
FIG. 2, the same view in emergency operation.

If there is a loss of oil at the bottom of this reservoir 2 or a breakdown of the normal lubricating system (leak in the circuit, breakdown of pump 4, clogging of filter 6, ...), as can be seen in FIG 2, the emergency reservoir 11 will gradually empty while continuing to lubricate the critical elements of the reduction units through ducts 12. The emergency reservoir is dimensioned so that it permanently contains an oil reserve available for feeding the critical elements of the reduction unit at a low rate, this low rate being obtained by appropriate dimensioning of the emergency ducts 12 and the presence of nozzles for controlling this flow. Thus, since the emergency reservoir 11 has a significant capacity and since there is a small emptying flow in the emergency circuit, minimum lubrication of the critical elements of the gear-box can be provided for an operating time sufficient for reaching an adequate landing ground. This emergency lubrication distribution circuit is specially provided and is independent of the normal pressurized circuit so as to optimize distribution of the lubricant contained in the emergency reservoir to the critical elements, not only from the point of view of the number of points to be lubricated and their choice, but also from that of the amount of lubricant to be fed to each point to be lubricated. For that, the distribution circuit is calibrated very precisely.

Figure 3:
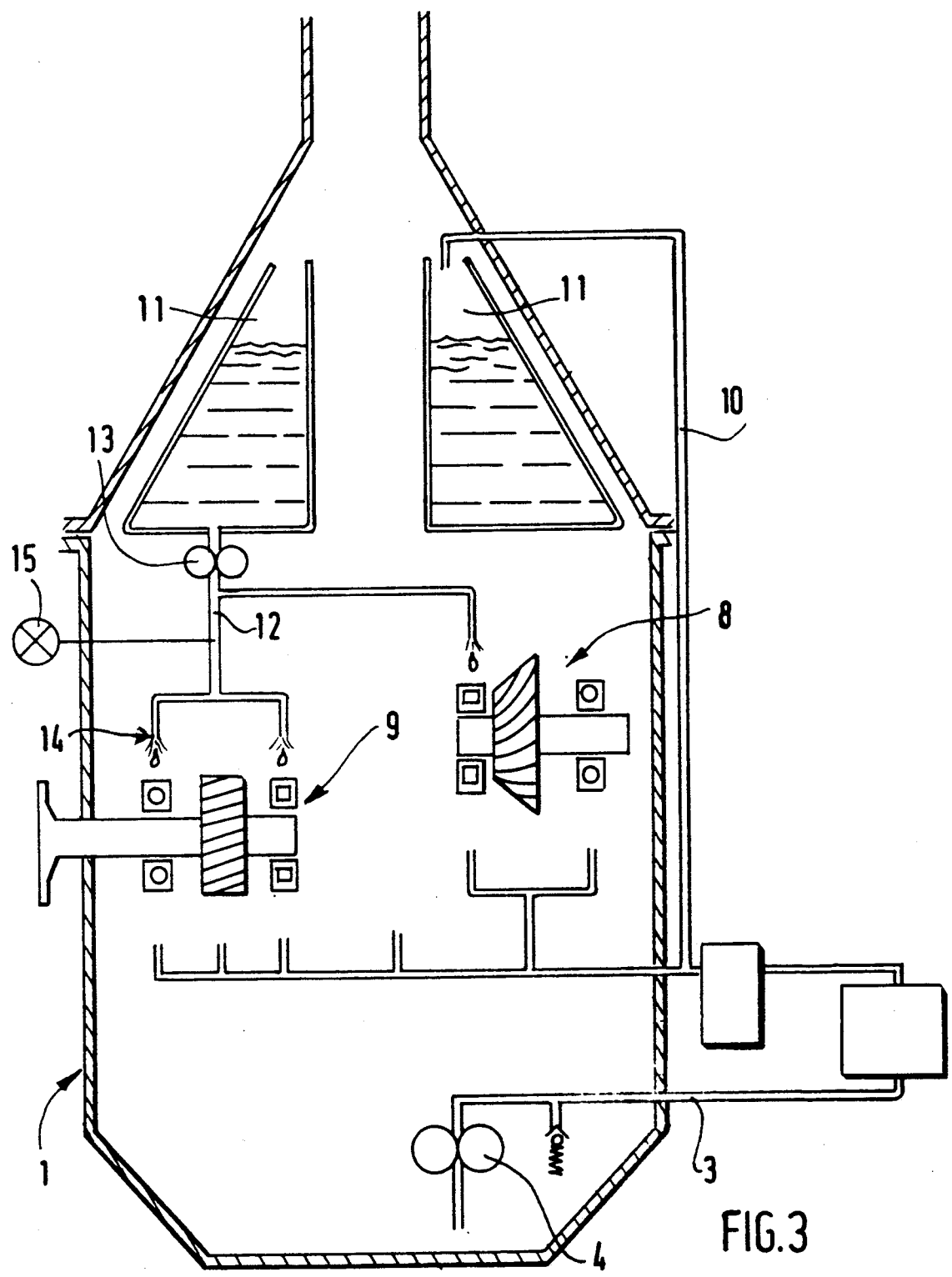
FIG. 3, a variant in emergency operation.

In the variant illustrated in FIG. 3, an emergency pump 13 is provided in at least one emergency supply duct 12, which feeds safety nozzles 14 at a low rate. Pump 13 is driven by the main gear-box and has a low oil pressure alarm 15. This makes it possible to permanently monitor the correct operation of this circuit and in the case of emergency operation to warn the pilot of the exhaustion of the emergency oil reserve.

We claim:

1. Emergency lubricating device for a gear reduction unit and more particularly for a main gearbox of a rotary-wing aircraft in which a normal lubricating circuit, fed by at least one pump, distributes oil from a normal reservoir under pressure through nozzles in a direction of elements of the gear reduction unit, said emergency lubricating device comprising:
   at least one branch duct branching from the normal lubricating circuit;
   a special emergency lubrication circuit; and
   at least one emergency reservoir fed by oil from said at least one branch duct to maintain a predetermined level of oil during normal operation and having an overflow connected to the normal reservoir, said at least one emergency reservoir continuously distributing the oil maintained therein through said special emergency lubrication circuit to critical elements of the gear reduction unit at a low rate prior to returning the oil to the normal reservoir, wherein a minimum lubrication of said critical elements is provided for a time sufficient to reach a landing ground during a complete failure of the normal lubricating circuit.

2. Emergency lubricating device according to claim 1, wherein the at least one emergency reservoir is placed above the critical elements of the gear reduction unit and the special emergency lubricating circuit comprises ducts connected to a lower part of the at least one emergency reservoir for lubricating the critical elements of the gear reduction unit or the main gearbox from above.

3. Emergency lubricating device according to claim 1, further comprising an emergency pump is provided in at least one supply duct supplying the special emergency lubricating circuit for pressure feeding emergency nozzles at a low rate.

4. Emergency lubricating device according to claim 3, the at least one supply duct of the special emergency lubricating circuit has a low oil pressure alarm.

* * * * *